Figure 1:
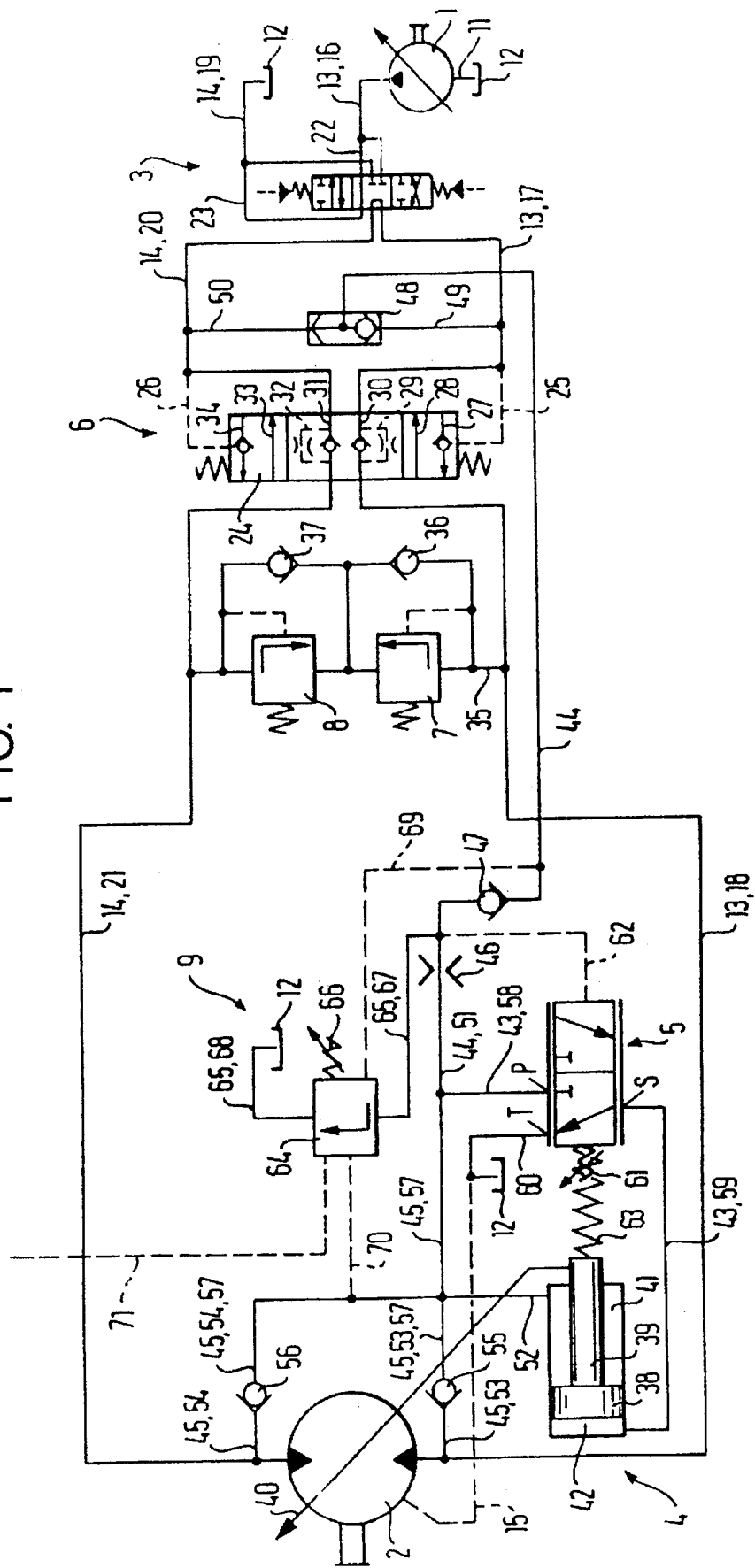

United States Patent [19]
Schniederjan

[11] Patent Number: 5,634,335
[45] Date of Patent: Jun. 3, 1997

[54] HYDROSTATIC TRANSMISSION WITH BRAKE VALVE

[75] Inventor: Reinhold Schniederjan, Neu-Ulm, Germany

[73] Assignee: Brueninghaus Hydromatik GmbH, Elchingen, Germany

[21] Appl. No.: 605,198

[22] PCT Filed: Jul. 28, 1994

[86] PCT No.: PCT/EP94/02504

§ 371 Date: Mar. 1, 1996

§ 102(e) Date: Mar. 1, 1996

[87] PCT Pub. No.: WO95/06830

PCT Pub. Date: Mar. 9, 1995

[30] Foreign Application Priority Data

Sep. 2, 1993 [DE] Germany .................. 43 29 689.0

[51] Int. Cl.[6] ............................................. F16D 31/02
[52] U.S. Cl. ..................................... 60/450; 60/451
[58] Field of Search .............................. 60/450, 451

[56] References Cited

U.S. PATENT DOCUMENTS 4,481,769  11/1984  Nagahara ..................... 60/451

Primary Examiner—F. Daniel Lopez
Attorney, Agent, or Firm—Scully, Scott, Murphy & Presser

[57] ABSTRACT

The invention relates to a hydrostatic transmission having a hydraulic pump (1) and an adjustable hydraulic motor (2) which is connected to first and second working lines (13, 14) of which at least the first (13) leads to the hydraulic pump, and a setting member (40)—for setting the motor displacement volume—is connected with a setting device (4) which upon load operation of the hydrostatic transmission can be acted upon by a setting pressure in a first setting pressure line (44, 57, 43) connected at least to the first working line, and in the case of overrun operation, can be acted upon by the setting pressure in a second setting pressure line (45, 51, 43), connected at least to the second working line. There is a brake valve (6) arranged at least in the second working line downstream of the connection of the second setting pressure line and which upon overrun operation of the hydrostatic transmission the respective working line is restricted. In order to be able to adapt the braking effect to differing operating conditions, there is provided a relief valve device (9, 10) which upon overrun operation is controlled by means of a control pressure taken from the second setting pressure line (45, 51, 43), against a counter-pressure (66, 76) in the direction of throughflow position and in this throughflow position relieves the setting pressure in the second setting pressure line (45, 51, 43) controllably via a relief line (65) to the tank (12).

15 Claims, 3 Drawing Sheets

HYDROSTATIC TRANSMISSION WITH BRAKE VALVE

The invention relates to a hydrostatic transmission with a brake valve, for application with open or closed circulation and with constant or variable direction of flow.

Such a hydrostatic transmission is for example known from DE-OS 41 29 667 as a reversible transmission, e.g. having variable direction of flow, and having open circulation, for the drive of excavator vehicles. In load operation of such an excavator vehicle, the hydraulic pump, driven by the drive source, delivers to the hydraulic motor via the first or the second working line—in each case serving as feed line—depending upon the direction of travel determined by means of a travel direction valve, in order to drive this hydraulic motor and thus the vehicle wheels. The brake valve, arranged in both working lines for reason of the reversibility of the transmission, is controlled by means of the working pressure prevailing in the respective feed line in load operation, via a control line, and thereby held in a position in which the brake valve makes possible both the unthrottled pressure medium feed via the feed line and also the unthrottled pressure medium return via the respective other working line serving as return line. Further, the working pressure in the feed line acts upon the setting device as setting pressure, via the first setting pressure line and via the second setting pressure line which is also connected to the first working line because of the reversibility of the transmission, in the direction of maximum displacement volume of the hydraulic motor.

In overrun operation of the hydraulic transmission, that is when the drive of the hydraulic motor is not effected by means of the hydraulic pump but is taken over by the vehicle wheels, for example upon travel down an incline, the working pressure in the feed line, and in the return line section downstream of the brake valve connected via the travel direction valve to the tank, falls and thus is available neither as control pressure for the brake valve nor as setting pressure, via the first setting pressure line, for the setting device. The brake valve hydraulically relieved of pressure in this way then takes up its braking position in which it throttles the pressure medium return by means of cross-sectional reduction of the return line and generates a corresponding backup pressure which brakes the hydraulic motor and thus the vehicle. The backup pressure in the return line acts as setting pressure on the setting device, via the second setting pressure line, in the direction of maximum displacement volume of the hydraulic motor and swings the latter out up to maximum displacement volume through continuous increase as a consequence of feedback. The maximum pressure medium flow generated by the hydraulic motor in this position generates a maximum backup pressure at the brake valve and thus a maximum braking force at the vehicle wheels.

This maximum braking force can, under certain operating conditions of the hydraulic transmission, give rise to undesirably great decelerations, such as for example upon the employment of a subsequently-connected mechanical gear change transmission which increases the braking force generated by the hydraulic motor in correspondence with the transmission ratio.

The object of the invention is to so further develop a hydrostatic transmission of the kind mentioned in the introduction that the braking effect achievable therewith can be adapted to differing operating conditions.

This object is achieved by a relief valve device, preferably in the form of a settable pressure limiting valve, which is controlled by the control pressure taken off from the second setting pressure line via a control line, in overrun operation of the hydrostatic transmission holds the setting pressure in the second setting pressure line at the pressure desired-value set in each case, with the aid of the counter-pressure, expediently in the form of a spring, which set pressure desired-value sets the hydraulic motor—via the setting device—to a corresponding displacement volume. The pressure medium flow generated from the hydraulic motor set in this way generates a corresponding backup pressure at the brake valve and thus a braking effect of the hydrostatic transmission which is proportional to the pressure desired-value set at the relief valve device.

The pressure regulation carried out in this way with the relief valve device preferably exhibits a proportional behaviour which is characterised by a p-Q characteristic line which increases with increasing displacement volume of the hydraulic motor. Such a characteristic line makes possible in a simple manner an association of the pressure desired-value set at the relief valve device and the displacement volume setting of the hydraulic motor, and thus of the braking effect. With direct pressure regulation, the proportional behaviour can be achieved in that the setting pressure works in the setting device against a spring having corresponding spring characteristic line. In the case of an indirect pressure regulation effected with a regulation valve, this spring acts additionally upon this regulation valve against a control pressure taken off from the first or the second setting pressure line, which control pressure acts in the direction of a regulation position in which the regulation valve regulates the setting pressure action on the control device in the direction of the maximum displacement volume. The pressure regulation is more accurate the steeper the characteristic line is. On the other hand, a flatter characteristic line means better power utilisation.

In order to prevent a connection of the two working lines via the setting device, and thereby to ensure the maintenance of the setting pressure, there is advantageously arranged in the first setting pressure line a non-return valve device opening in the direction of the setting device and there is arranged in the second setting pressure line, upstream—referring to the overrun operation—of the connection of the control line and the relief line, likewise a non-return valve opening in the direction of the setting device.

Preferably, the relief valve device is, with a further control pressure, arbitrarily controllable or controllable in dependence upon a freely selectable parameter, in the direction of a throughflow position. With this further control pressure, the control of the relief valve device with the control pressure taken off from the second setting pressure line in overrun operation can be overridden or for example in load operation a second drive position, with higher travel speed, can be switched in arbitrarily or for example in dependence upon the speed of rotation of the hydraulic motor.

With the configuration of the hydrostatic transmission for reversible operation with the arrangement of the brake valve in both working lines and connection of the first setting pressure line between hydraulic pump and brake valve, and connection of the second setting pressure line between hydraulic motor and brake valve, to both working lines, in accordance with a further development of the invention the relief valve device is controlled in the direction of closed position by means of a control pressure taken off from the first setting pressure line via a control line, upstream of the non-return valve device, against the control pressure taken off from the second setting pressure line. It is thus ensured that the relief valve device is—only in overrun operation but not, however, also in load operation—controlled in the direction of the throughflow position by means of the control pressure taken off from the second setting pressure line connected to both working lines.

In accordance with a further development of the invention, the relief valve device includes a preferably settable pressure limiting valve and a switching valve which are both arranged in the relief line, the former downstream of the latter, and which are in each case controlled by the control pressure taken off from the second setting pressure line, against the counter-pressure, in the direction of throughflow position, whereby the counter-pressure at the pressure limiting valve is larger than the preferably settable counter-pressure at the switching valve. This switching valve is expediently employed in the case of control of the relief valve device with the control pressure taken off from the first setting pressure line, and is controlled with this control pressure. Here, the difference of the counter-pressures at the pressure limiting valve and at the switching valve corresponds to the maximum pressure variation, of about 50 bar, relative to the theoretical pressure value 0, appearing in practice, in overrun operation, in the feed line and in the return line section downstream of the brake valve and in the connected first setting pressure line. The switching valve in this way prevents, in the case of overrun operation, any influence of the mentioned pressure variations on the precision of the relief and therewith the setting of the setting pressure in the second setting pressure line. If appropriate, the switching valve is controlled additionally with a further control pressure.

Advantageously, the first and the second setting pressure lines include a common setting pressure line leading to the setting device and a first and a second setting pressure branch line which branch off from the common setting pressure line at a branch point and in which the non-return valve devices are arranged.

The regulation valve is expediently arranged in the common setting pressure line, the control of which regulation valve can be effected with the control pressure via a control line connected to the first setting pressure branch line in the region between the non-return valve device and a throttle. Thereby there is provided in load operation an instant, delay-free response of the regulation valve and thus of the setting device whilst in overrun operation the setting pressure supply of the setting device is delayed and therewith a too rapid build up of the brake pressure and/or undamped carry through of brake pressure variations on the setting device are prevented.

Further features and advantages of the invention can be understood from the remaining subclaims.

Figure 2:
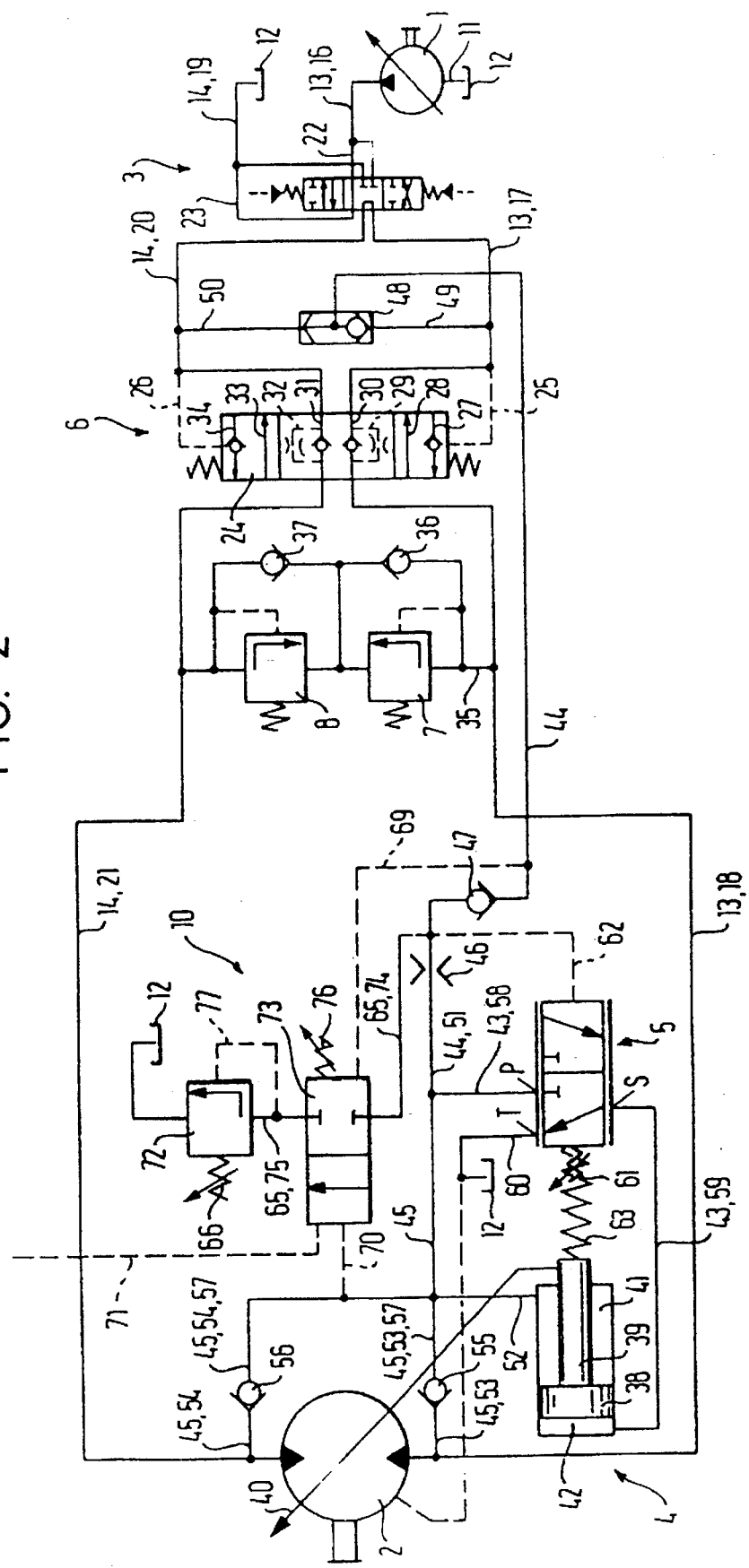
Figure 3:
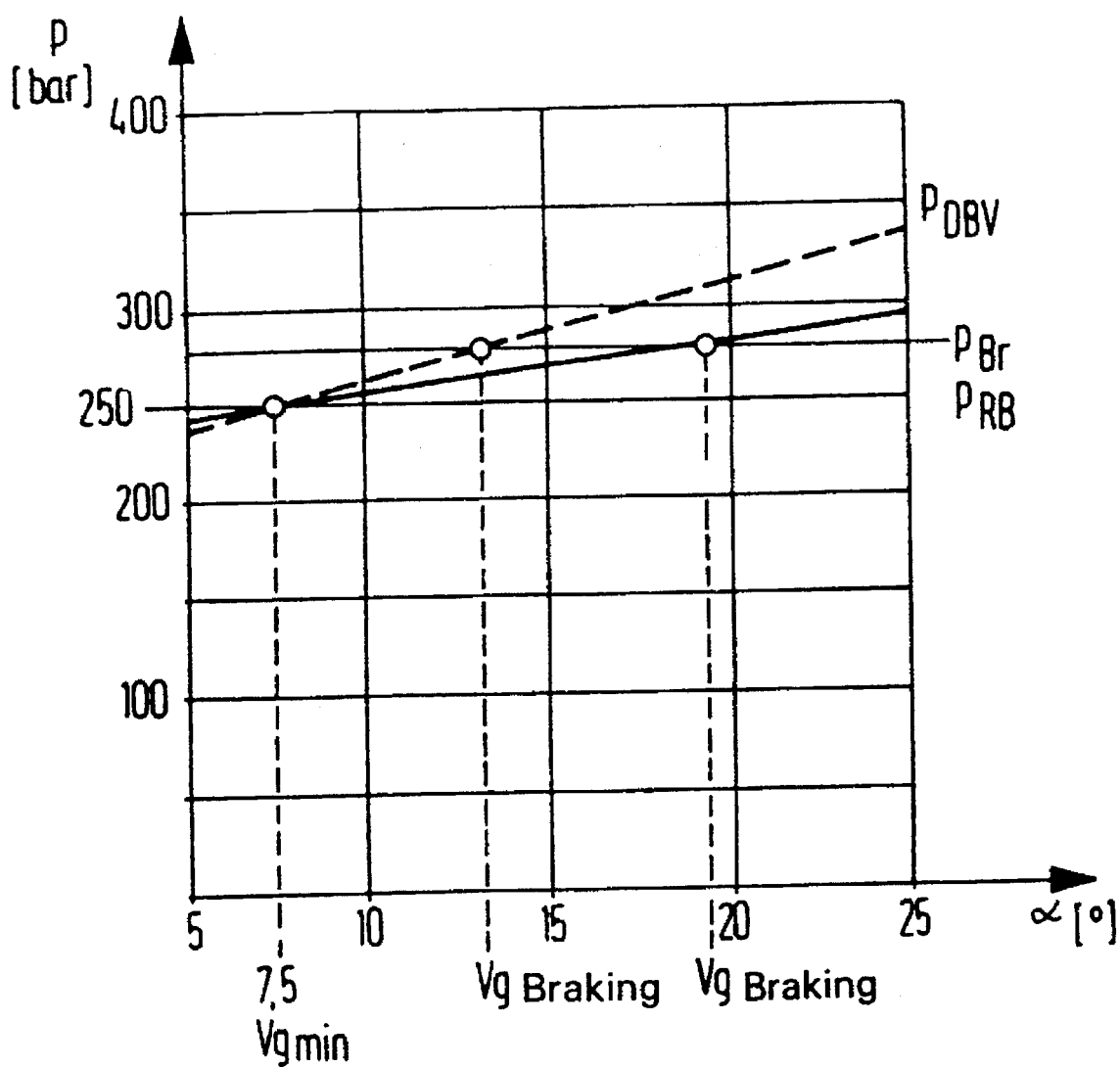

Below, the hydrostatic transmission in accordance with the invention is described in more detail with reference to two preferred exemplary embodiments and with reference to the drawings, which show:

FIG. 1 a switching plan of a hydrostatic transmission in accordance with the first exemplary embodiment of the invention, FIG. 2 a switching plan of a hydrostatic transmission in accordance with the second exemplary embodiment of the invention, FIG. 3 a diagram which shows the association between the displacement volume setting of the hydraulic motor and the setting pressure.

The drawings show a hydrostatic transmission provided as travel drive for a vehicle, which hydrostatic transmission is formed with variable flow direction and open circulation, but can also have an constant flow direction and a closed circulation. It includes an adjustable hydraulic pump 1 having a displacement direction, an adjustable hydraulic motor 2, a travel direction valve 3 for reversing the direction of rotation of the hydraulic motor 2 and thus the travel direction of the vehicle, a setting device 4 having an associated regulation valve 5 for adjusting the displacement volume of the hydraulic motor 2, a hydraulic brake device having a brake valve 6 and two associated pressure limiting valves 7, 8 along with a relief valve device 9 (see FIG. 1) or 10 (see FIG. 2).

The hydraulic pump 1 is connected to the tank 12 via a suction line 11 and can be driven by a drive source (not shown), e.g. a Diesel motor. The hydraulic motor 2 is connected to the hydraulic pump 1 via a first working line 13 and connected to the tank 12 via a second working line 14 and via a leakage oil line 15. The hydraulic motor is coupled with a gear transmission (not shown) for the purpose of driving the vehicle wheels (likewise not shown).

The travel direction valve 3 and the brake valve 6 are arranged in both working lines 13, 14, the former valve nearer to the hydraulic pump 1 and the latter valve nearer to the hydraulic motor 2. The line sections of the first working line 13 between the hydraulic pump 1 and the travel direction valve 3, between the travel direction valve 3 and the brake valve 6 and between the brake valve 6 and hydraulic motor 2 are indicated by the reference signs 13, 16; 13, 17 and 13, 18 and the corresponding line sections of the second working line 14 are indicated, starting from the tank 12, with the reference signs 14, 19; 14, 20 and 14, 21.

The travel direction valve 3 is an arbitrarily actuable 6/3-way valve with the switching positions: forwards travel, idling and rearwards travel. It has, correspondingly, respective ports to the working line sections 13, 16; 13, 17; 14, 19 and 14, 20 and two further ports of which one is connected, on the pump side, via a line piece 22, to the working line section 13, 16 and, on the motor side, via a line piece 23, to the working line section 14, 19.

In the idling position of the travel direction valve 3 shown in the drawings, the two ports to the line pieces 22 and 23 are connected with one another, as are the two ports on the motor side to the working line section 13, 17 and 14, 20, whilst the remaining two ports are blocked. In this idling position, the hydraulic pump delivers to the tank 12 whilst the hydraulic motor 2 is switched to circulation.

In the upper switching position in the drawings, e.g. with the piston of the travel direction valve 3 displaced downwardly, the connection between the two ports to the working line sections 13, 16 and 13, 17 is established, as is the connection between the ports to the working line sections 14, 19 and 14, 20, whilst the remaining two ports are blocked. This upper switching position of the travel direction valve 3 corresponds to forwards travel of the vehicle; the pressure medium feed from the hydraulic pump 1 to the hydraulic motor 2 is effected via the first working line 13 and the pressure medium return to the tank 12 effected via the second working line In the lower switching position of the travel direction valve 3, in the drawings, the connections of the ports which are open in the upper switching position are exchanged with one another so that the vehicle is set to rearwards travel. Correspondingly, the pressure medium feed is effected via the working line sections 13, 16; 14, 20 and 14, 21 and the return via the working line sections 13, 18; 13, 17 and 14, 19.

The brake valve 6 is a continuously adjustable 4/3-way valve the control piston 24 of which is held in the middle or braking position shown in the drawings by spring centring and is adjustable in the direction of upper and lower end positions as seen in the drawings—by means of hydraulic action. The hydraulic action is effected at both end faces of the control piston 24 in each case via a control line 25 or 26 connected to the working line sections 13, 17 or 14 20. The brake valve 6 includes respective ports to the working line sections 13, 17; 13, 18; 14, 20 and 14, 21 along with eight throughflow channels 27 to 34. The throughflow channels 29 and 32 have each, relative to the working lines 13, 14 and the remaining throughflow channels, a reduced, throttling cross-section. In the throughflow channels 27, 30, 31 and 34 there are arranged respective non-return valves which block in the direction of the hydraulic pump 1, whilst the remaining throughflow channels can be flowed through in both directions. In the braking position of the brake valve 6, the two ports to the working line sections 13, 17 and 13, 18 are connected via the throughflow channels 29 and 30, whilst the two ports to the working line sections 14, 20 and 14, 21 are connected with one another via the throughflow channels 31 and 32. The same ports are, in the lower end position of the brake valve 6, connected via the throughflow channels 27 or 28, and they are connected in the upper end position via the throughflow channels 33 or 34.

The settable pressure limiting valves 7, 8 are arranged in a line 35 which connects the working line sections 13, 18 and 14, 21. Two non-return valves 36 and 37, blocking in opposite directions, are arranged in respective bypasses around the pressure limiting valves 7, 8.

The setting device 4 consists of a double acting setting cylinder having a differential piston 38 which is coupled via a piston rod 39 with a setting member 40 for adjusting the displacement volume of the hydraulic motor 2 and which with its smaller, annular end face defines a first pressure chamber 41 penetrated by the piston rod 39 and defines with its opposite, larger, circular end face a second pressure chamber 42. The latter is connected to a setting pressure line 43 from which, at a branch point A, a first setting pressure branch line 44 and a second setting pressure branch line 45 branch off.

The first setting pressure branch line 44 leads, via a throttle 46 and a non-return valve 47 opening in the direction of this throttle, to a change-over valve 48 which is connected via two setting pressure connection lines 49, 50 to the working lines sections 13, 17 and 14, 20. The section of the first setting pressure branch line 44 between the branch point A and the non-return valve 47 is indicated with the reference sign 51.

The second setting pressure branch line 45 is connected to the first pressure chamber 41 of the setting device 4 via a setting pressure line section 52 and includes two setting pressure connection lines 53, 54 which establish the connection with the working line sections 13, 18 and 14, 21. In the setting pressure connection lines 53, 54 there are arranged respective non-return valves 55, 56 which block in the direction of the working line sections 13, 18 and 14, 21. The section of the second setting pressure branch line 45 between these non-return valves 55, 56 and the branch point A is indicated with the reference sign 57.

The first setting pressure branch line 44, the section 57 of the second setting pressure branch line 45 and the common setting pressure line 43 form, in the load operation of the hydraulic transmission as described below, a first setting pressure line 44, 57, 43 in which the working pressure in the respective feed line section 13, 17 or 14, 20 prevails as setting pressure.

The second setting pressure branch line 45, the section 51 of the first setting pressure branch line 44 and the common setting pressure line 43 form, in the overrun operation of the hydrostatic transmission as described below, a second setting pressure line 45, 51, 43 in which the working pressure in the respective return line section 14, 21 or 13, 18 prevails as setting pressure.

The regulation valve 5 is arranged in the setting pressure line 43 and constituted as continuously adjustable 3/2-way valve. It has two ports P and S to the line sections 58 and 59 of the setting pressure line 43 which lead to the setting pressure branch lines 44, 45 and to the pressure chamber 42 of the setting device 4, and a port T which leads via a line piece 60 to the tank 12. The regulation valve S is held in the initial position (on the right) shown in the drawings through the force of a settable spring 61 and is controllable against the force of the spring 61 in the direction of the (left) end position by a control pressure taken off via a control line 62—as control pressure—from the first setting pressure branch line 44 in the region between the throttle 46 an the non-return valve 47. The regulation valve 5 is coupled with the piston rod 39 on the setting device 4 via a travel measurement spring 63 engaging on the same side as the spring 61. In the initial position of the regulation valve 5, the port P to the setting pressure line section 43, 58 is blocked whilst the two remaining ports S and T are connected with one another. In the regulation region, i. e. in all regulation positions including the end position, the ports P and S of the regulation valve S are open whilst the tank port T is blocked.

The relief valve device 9 according to FIG. 1 includes a pressure limiting valve 64 which is arranged in a relief line 65 leading to the tank 12 and connected to the section 51 of the first setting pressure branch line 44 between the throttle 46 and the non-return valve 47, and which is held by means of a spring 66 in the closed position. The sections of the relief line 65 upstream and downstream of the pressure limiting valve 64 are indicated with the reference signs 67 and 68. The pressure limiting valve 64 has three control ports, one on the side of the spring 66 and two on the opposite side. The control port on the spring side is connected to the section of the first setting pressure branch line 44 between the non-return valve 47 and the change-over valve 48, via a control line 69. One of the two remaining control ports is connected via a control line 70 to the section 54 of the second control pressure branch line 45. A further control line 71 leads to the last remaining control port of the pressure limiting valve 64 and permits the control thereof via the control lines 69 and 70 to be overridden. Since this overriding can take place arbitrarily or in dependence upon a freely selectable parameter, such as for example the speed of rotation of the hydraulic motor 2, the control line 71 is shown in the drawings as a dead end.

The relief valve device 10 according to FIG. 2 includes the pressure limiting valve according to FIG. 1, acted upon by means of the same settable spring 66 in the direction of the closed position, but which pressure limiting valve—because of its altered control—is provided with the reference sign 72, and additionally includes a switching valve 73 which is arranged upstream of the pressure limiting valve 72 in the relief line 65 and divides the relief line into relief line sections 74 and 75 lying upstream and downstream. The switching valve 73 is formed as 2/2-way valve and is controlled in the same manner as the pressure limiting valve 64 according to FIG. 1. In other words, the switching valve 73 acted upon by a settable spring 76 in the direction of the closed position shown in FIG. 2 is controlled in the same direction by the control pressure taken off from the first setting pressure branch line 44 between the non-return valve 47 and the change-over valve 48 via the control line 69, against the control pressure supplied via the control line 71 and the control pressure taken off from the second setting pressure branch line 45 via the control line 70. The pressure limiting valve 72 is controlled in conventional manner, in the direction of throughflow position, by the pressure taken off via a control line 77 from the relief line section 75 between the two valves 72 and 73.

The function of the hydrostatic transmission in accordance with the invention according to FIG. 1 is as follows:

With the vehicle at a standstill, the travel direction valve 3 and the brake valve 6 are in their respective middle positions, so that the driven hydraulic pump delivers via the line pieces 22, 23 into the tank 12 and the hydraulic motor is correspondingly not driven. The working line sections 13, 17; 13, 18; 14, 20 and 14, 21, and thus also the first setting pressure branch line 44 and the second setting pressure branch line 45 are pressureless, so that the pressure limiting valve 64 is in the closed position, under the effect of the spring 66, and the regulation valve 5 is in the initial position, under the effect of the springs 61, 63, in which position the pressure chamber 42 of the setting device 4 is relieved to the tank 12. The differential piston 38 takes up, under the pressure of the travel measurement spring 63, the left end position shown in FIG. 1, which corresponds to the minimum displacement volume of the hydraulic motor 2.

After switching of the travel direction valve 3 into the upper switching position, the hydraulic pump 1 delivers into the first working line 13 serving as feed line. The working pressure which thus builds up in the working line section 13, 17 prevails also as setting pressure in the first setting pressure line 44 and in the section 57 of the second setting pressure branch line 45 which extends up to the closed non-return valves 55, 56, and in the setting pressure line section 43, 48. It is effective on the pressure limiting valve 64, via the control line 69 and 70, as pressure difference, so that this pressure limiting valve is held in the closed position solely by means of the spring 66. It is further effective, via the control pressure line 62, as control pressure on the regulation valve 5 and displaces this valve in the direction end position as soon as the hydraulic force of the control pressure exceeds the force of the springs 61, 63. The regulation valve 5 establishes the connection between the setting pressure line sections 43, 58 and 43, 59, so that the pressure medium in the working line section 13, 17 flows via the opened non-return valve 47 in the first setting pressure branch line 44 as setting pressure medium into the pressure chamber 42 of the setting device 4 and, with sufficient pressure, displaces the differential piston 38, with increasing loading of the travel measurement spring 63, in the direction of its right end position, which corresponds to the maximum displacement volume of the hydraulic motor 2. As soon as the spring forces of the springs 61, 63 are in balance with the hydraulic force of the control pressure, the regulation point is reached, i.e. the regulation valve 5 and the differential piston 38 take up respective positions corresponding to the level of the control pressure which corresponds to a displacement volume setting of the hydraulic motor to a displacement volume greater than the minimum displacement volume. The working pressure prevailing in the working line section 13, 17 simultaneously has effect, via the control line 25, on the control piston 24 of the brake valve 6 and displaces this into the lower end position, so that the pressure medium transported by the hydraulic pump 1 flows to the hydraulic motor 2 via the throughflow channel 27 in the brake valve 6 and drives the motor. In this way, the vehicle begins to move forwards. The pressure medium return to the tank 12 is effected unthrottled via the working line section 14, 21, the throughflow channel 28 in the brake valve 6 and the working line sections 14, 20 and 14, 19. Since the working pressure is greater upon starting of the vehicle, i.e. in the case of acceleration, than with non-accelerated travel, the regulation valve 5 and thus the differential piston 38 in general assume their respective end positions, so that the hydraulic motor 2 is swung Out to maximum displacement volume. With decreasing working pressure, such as occurs for example in the case of non-accelerated travel, through corresponding return of the regulation valve 5 and of the differential piston 38 into a corresponding intermediate position, the hydraulic motor 2 is swung back to a corresponding reduced displacement volume.

Instead of in dependence upon the working pressure, the hydraulic motor 2 can, by means of the pressure limiting valve 64, also be swung back to a reduced displacement volume arbitrarily or for example in dependence upon the speed of rotation of the hydraulic motor 2. In the first case, the pressure limiting valve 64 is controlled through manual actuation of a control valve (not shown) in the control line 71 with a control pressure for example taken from the working line 13, and in this way displaced into the throughflow position so that the setting and control pressure prevailing in the first setting pressure line 44, 57, 43 is reduced by means of controlled relief to the tank 12 to a correspondingly lower value. In the latter case, the pressure limiting valve 64 is controlled via the control line 71 with a control pressure proportional to the speed of rotation of the hydraulic motor 2.

The above-described procedures occur likewise upon rearward travel of the vehicle, solely with the difference that the travel direction valve 3 takes up the lower switching position and the brake valve 6 takes up the upper end position and the working pressure prevails in the second working line 14, now serving as feed line, whilst the pressure medium return is effected via the first working line 13.

Upon the value set in each case at the pressure limiting valves 7, 8 being exceeded, the pressure in the more heavily loaded working line section 13, 18; 14, 21 is relieved via the pressure limiting valve 7 or 8 to the respective other working line section 14, 21 or 13, 18.

As soon as the vehicle changes over from the above-described load operation into overrun operation, that is when the drive of the hydraulic motor 2 is not effected by means of the hydraulic pump 1 but is taken over by the vehicle wheels, for example upon travel down an incline or upon idling of the diesel motor, the working pressure in the working line serving as feed line in each case - 13 (in the case of forwards travel) or 14 (in the case of rearwards travel)—falls, and thus falls also in the control line 25 or 26. The brake valve 6, hydraulically pressure relieved in this manner, takes up the braking position under the effect of its spring centring. In this position the hydraulic motor 2, driven by the vehicle wheels and acting as a pump, transports the pressure medium drawn in via the respective feed line 13 (in the case of forwards travel) or 14 (in the case of rearwards travel) inclusive of the throughflow channel 30 or 31, via the working line serving as return line—14 (in the case of forwards travel) or 13 (in the case of rearwards travel)—inclusive of the respective throughflow channel 32 or 29 in the brake valve 6, to the tank 12. Thereby, there builds up in the respective working line section 14, 21 or 13, 18 a backup pressure corresponding to the throttle effect of the respective throughflow channel 32 or 29, which brakes the hydraulic motor 2. Since the pressure medium, after the throttling throughflow channel 32 or 29, flows away practically pressurelessly via the working line section 14, 20 or 13, 17 to the tank 12, the control line 26 or 25 and the first setting pressure branch line 44 and thus the control line 62 and the control lines 69, 70 are likewise pressureless. In this way, the pressure limiting valve 64 remains in the closed position, under the effect of the spring 66, and the brake valve 6 remains in the braking position throughout the duration of the overrun operation; neither does there arise the pressure medium action on the regulation valve 5 and the differential piston 38 via the change-over valve 48 which during load operation of the hydrostatic transmission works against the swinging back forces of the drive of the hydraulic motor 2. Instead, the backup pressure in the return line section 14, 21 (in the case of forwards travel) or 13, 18 (in the case of rearwards travel) prevails also in the setting pressure connection line 54 or 53—with opened non-return valve 56 or 55—, in the connecting section 57 of the second setting pressure branch line 45, in the section 51 of the first setting pressure branch line 44—with closed non-return valve 47—and in the setting pressure line section 43, 58 and acts in the above-described manner on the regulation valve 5 and, upon attainment of the regulation point, displaces the differential piston 38 in the likewise above-described manner in the direction of the respective end position, i.e. in the direction of the maximum displacement volume of the hydraulic motor 2. This generates a correspondingly larger pressure medium flow which upon passage through the throttling throughflow channel 32 or 29 gives rise to a correspondingly greater backup pressure. This greater backup pressure or greater pressure medium flow in turn works back on the regulation valve 5 and the setting device 4 and causes a further swinging out of the hydraulic motor 2 until this motor is in the end regulated to its maximum displacement volume and generates a maximum braking pressure and thus a maximum braking moment at the vehicle wheels.

During this above-described regulation procedure the backup pressure—prevailing as setting and control pressure—in the above mentioned lines and line sections 54 or 53, 57, 51, 58—which, as already explained, form in the case of overrun operation of the hydrostatic transmission, together with the setting pressure line section 59, a second setting pressure line 44, 51, 43 —, has effect via the control line 70 on the pressure limiting valve 64 and opens this as soon as the hydraulic force of the control pressure exceeds the force of the spring 66. The backup pressure prevailing in the first setting pressure line 45, 51, 43 as setting and control pressure is throttled by means of the throttle 46 and the pressure limiting valve 64 and relieved in a controlled manner to the tank 12, so that there arises in the first setting pressure line 45, 51, 43 a setting and control pressure which corresponds to the pressure desired-value set at the pressure valve 64 with the spring 66, which setting and control pressure displaces in above-described manner the regulation valve 5 and the setting piston 38 and thus sets the hydraulic motor 2 to a corresponding displacement volume. If, for example, the commencement of regulation by the regulation valve 5 is set —corresponding to the setting force of the spring 61—to a pressure $p_{RB}$ of 250 bar and the pressure limiting valve 64 is set to a pressure $P_{Br}$ of 280 bar then there is provided in accordance with FIG. 3 a swing angle of 19.5° for the hydraulic motor 2 corresponding to the (flatter) spring characteristic line of the travel measurement spring 63 ($\Delta p$ 50 bar) shown with a solid line, and there is provided a swing angle of 13.5° in correspondence to the (steeper) spring characteristic line of the travel measurement spring 63 ($\Delta p$=100 bar) represented with a broken line. Such a setting of the hydraulic motor to a displacement volume which is less than the maximum possible displacement volume is for example necessary if the vehicle should not be braked to a standstill in the case of travel down an incline.

The above-described control of the pressure limiting valve 64 via the control line 70 can be overridden as described above with the control pressure in the control line 71 also in the case of overrun operation of the hydrostatic transmission.

The hydrostatic transmission in accordance with FIG. 2 differs in its function from that according to FIG. 1 in that the switching valve 73 is, in the case of load operation of hydrostatic transmission, controlled in the same manner as the pressure limiting valve 64 of FIG. 1 and remains closed together with the pressure limiting valve 72, whilst in overrun operation of the hydrostatic transmission it is taken into the throughflow position earlier than the pressure limiting valve 72 since in comparison with the pressure limiting valve 72 it is set by means of the spring 76 to a lesser pressure desired-value-lesser by the maximum return pressure variation of about 0–50 bar occurring in practice in the working line section 14, 29 (in the case of forwards travel) or 13, 17 (in the case of rearwards travel). In its throughflow position, the switching valve 73 connects the relief line sections 74, 75 with one another. The pressure limiting valve 72, now controlled by the pressure in the relief line section 75 via the control line 77, opens as soon as the hydraulic force of this pressure exceeds the force of the spring 66. The relief of the setting and control pressure into the second setting pressure line 45, 51, 43 is effected in the same manner as with the pressure limiting valve 64 according to FIG. 1, but with the result of a more exact setting of the setting pressure and thus of the displacement volume of the hydraulic motor, since the switching valve 73 prevents influencing of the control of the pressure limiting valve 72 by the return pressure variations.

I claim:

1. Hydrostatic transmission,
    having at least one hydraulic pump (1) and at least one adjustable hydraulic motor (2) which is connected to a first and to a second working line (13, 14) of which at least the first (13) leads to the hydraulic pump, and a setting member (40) which controls the displacement volume of the motor is connected with a setting device (4) and which upon load operation of the hydrostatic transmission is selectively acted upon by a setting pressure in a first setting pressure line (44, 57, 43) connected at least to the first working line, and in the case of overrun operation of the hydrostatic transmission is selectively acted upon by a setting pressure in a second setting pressure line (45, 51, 43), connected at least to the second working line, in a direction of maximum displacement volume of the hydraulic motor, and
    having a brake valve (6) that is arranged at least in the second working line downstream of the connection of the second setting pressure line and which upon overrun operation of the hydrostatic transmission at least restricts the respective working line,
characterised by a relief valve device (9, 10) which upon overrun operation of the hydraulic transmission is controlled by means of a control pressure taken from the second setting pressure line (45, 51, 43), against a counter-pressure (66, 76), in the direction of throughflow position, and in this throughflow position relieves the setting pressure in the second setting pressure line (45, 51, 43) controllably via a relief line (65) to a tank (12).

2. Hydrostatic transmission according to claim 1, characterised in that, the relief valve device (9) is formed as a pressure limiting valve (64) arranged in the relief line (65), controlled with the control pressure taken from the second setting pressure line (45, 51, 43) via a control line (70), against the counter-pressure (66).

3. Hydrostatic transmission according to claim 1, characterised in that, the relief valve device (10) includes a pressure limiting valve (72) and a switching valve (73) which are both arranged in the relief line (65), the former (72) downstream of the latter (73), and which are each controlled by the control pressure taken from the second setting pressure line (45, 51, 43), against a counter-pressure (66, 76), in the direction of the throughflow position, whereby the counter-pressure (66) at the pressure limiting valve (72) is larger than the counter-pressure (76) at the switching valve (73).

4. Hydrostatic transmission according to claim 3, characterised in that, the switching valve (73) is directly connected to the second setting pressure line (45, 51, 43) via a control line (70) and the pressure limiting valve (72) is indirectly connected to the second setting pressure line (45, 51, 43) by way of a control line (77) via the section (75) of the relief line (65) between the two valves (72, 73).

5. Hydrostatic transmission according to any preceding claim, characterised in that, the counter-pressure (66, 76) acting upon the relief valve device (9, 10) in the direction of the closed position is the pressure of a settable spring.

6. Hydrostatic transmission according to any of claim 3 or 4 characterised in that, the switching valve (73) is controlled with a control pressure taken from the first setting pressure line (44, 57, 43) via a control line (69) or is controllable with a further control pressure via a further control line (71).

7. Hydrostatic transmission according to claim 1, characterised in that, there is arranged in the first setting pressure line (44, 57, 43) a non-return valve device (47) opening in the direction of the setting device (4) and there is arranged in the second setting pressure line (45, 51, 43) likewise a non-return valve device (55, 56) opening in the direction of the setting device (4), upstream—referred to overrun operation—of the connections of the control line (70) and of the relief line (65).

8. Hydrostatic transmission according to claim 7, in a reversible configuration, whereby the brake valve (6) is arranged in both working lines (13, 14), the first setting pressure line (44, 57, 43) is connected between the hydraulic pump (1) and the brake valve (6) and the second setting pressure line (45, 51, 43) is connected between the hydraulic motor (2) and the brake valve (6) to both working lines (13, 14), characterised in that, in the case of load operation of the hydrostatic transmission, the relief valve device (6, 10) is controlled by means of a control pressure taken from the first setting pressure line (44, 57, 43) via a control line (69) upstream of the non-return valve device (47), against the control pressure taken from the second setting pressure line (45) 51, 43), in the direction of the closed position.

9. Hydrostatic transmission in accordance with claim 1, characterised in that, the relief valve device (9, 10) is, with a further control pressure, arbitrarily controllable or controllable in dependence upon a freely selectable parameter via a further control line (71), against the counter-pressure (66, 76), in the direction of the throughflow position.

10. Hydrostatic transmission in accordance with claim 1, characterised in that, the setting device (4) is acted upon by means of a spring (63) in the direction of minimum displacement volume of the hydraulic motor (2).

11. Hydrostatic transmission according to claim 10, characterised by a regulation valve (5) which—in load and in overrun operation of the hydraulic transmission—is controlled with a control pressure taken from the first setting pressure line (44, 57, 43) or from the second setting pressure line (45, 51, 43), against a counter-pressure, in the direction of a regulation position, and in this regulation position regulates a setting pressure action on said setting device (4) in the direction of the maximum displacement of the hydraulic motor (2), whereby the counter-pressure includes the pressure of the spring (63) acting upon the setting device (4), the loading of which spring increases with increasing displacement of the setting device (4) in the direction of maximum displacement volume of the hydraulic motor (2).

12. Hydrostatic transmission according to claim 11, characterised in that, the first and the second setting pressure line (44, 57, 43; 45, 51, 43) include a common setting pressure line (43) leading to the setting device (4) and a first and a second setting pressure branch line (44, 45) which branch off at a branch point (A) from the common setting pressure line (43) and in which the non-return valve devices (47; 55, 56) are arranged.

13. Hydrostatic transmission according to claim 12, characterised in that, the regulation valve (5) is arranged in the common setting pressure line (43).

14. Hydrostatic transmission according to any of claims 11 to 13, characterised in that, the setting pressure for control of the regulation valve (5) is taken from the first setting pressure branch line (44), in the region between the non-return valve device (47) and a throttle (46), via a control line (62).

15. Hydrostatic transmission according to claim 14, characterised in that, the relief line (65) is connected to the first setting pressure branch line (44) in the region between a non-return valve device (47) and a throttle (46).

* * * * *